June 13, 1950 W. H. BRESEE 2,511,562
LINEARITY CORRECTION FOR DIODES
Filed March 25, 1947
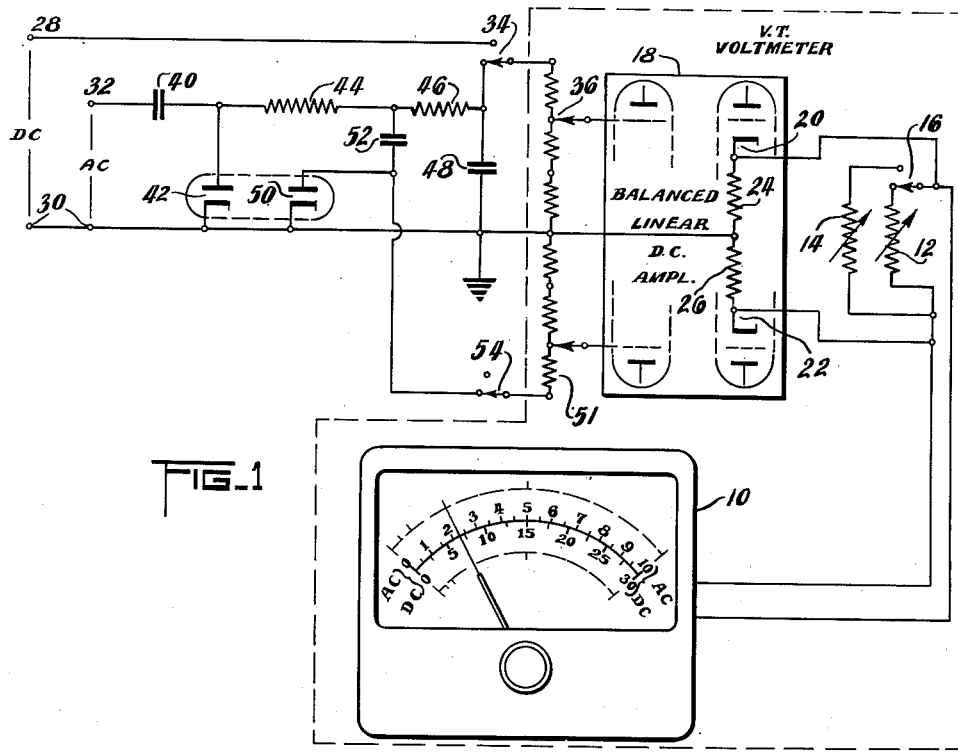
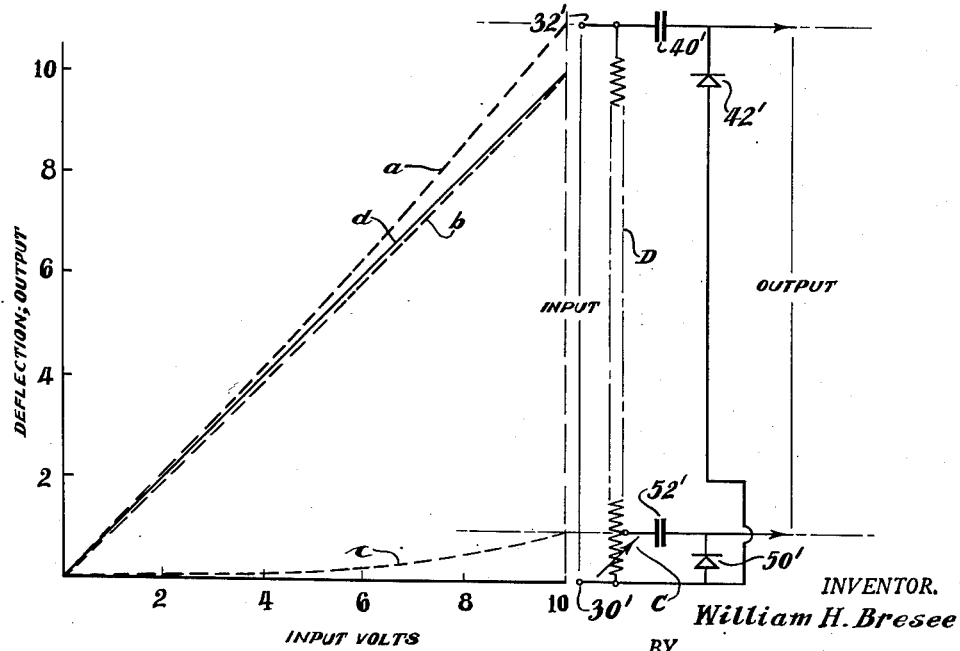
INVENTOR.
William H. Bresee
His Attorney Patented June 13, 1950

2,511,562

UNITED STATES PATENT OFFICE 2,511,562

LINEARITY CORRECTION FOR DIODES

William H. Bresee, Williamsport, Pa., assignor to Sylvania Electric Products, Inc., a corporation of Massachusetts Application March 25, 1947, Serial No. 736,995

11 Claims. (Cl. 171—95)

This invention relates to rectifiers used in alternating current circuits, more particularly in A.-C. measuring circuits. The broad purpose of the invention is to provide a circuit that will correct for the curved rectification characteristic which is common to rectifiers, especially in the case of thermionic diodes, so as to obtain a practically linear characteristic, at least at the low-voltage part of their range of operability.

The invention is particularly useful in multiple purpose meters, each having a single indicator; for example, where a single D.-C. meter is to function for both alternating current and direct current readings, and is to have multiple ranges of both. It would be unduly confusing if a single meter-face with a single indicator were to have a separate scale and a separate set of divisions for each direct-current range, for each alternating-current range, for various resistance ranges, and so on. It is therefore advantageous, if possible, to use each scale and set of calibrating numerals for as many purposes as possible. An additional object of this invention, accordingly, is to provide a rectifier circuit which will enable the use of a linear scale on a meter for accurate readings of both direct-current and alternating-current voltages, and to provide an improved A.-C. measuring instrument having a linear scale.

A common form of alternating-current voltmeter employs a direct-current indicator together with a rectifier. The output or rectification characteristic of the rectifier is usually curved markedly for low applied voltages but is reasonably straight over wide ranges. The preferred embodiment of the invention constitutes an improvement over that form of instrument. The improved circuit includes a compensating rectifier in addition to the usual rectifier. The compensating rectifier is connected in such fashion that its non-linear output is used as a reference for the non-linear output of the usual rectifier, the difference thus derived being linear for practical purposes. Thus, a departure from linearity equalling .3-volt in the 10-volt A.-C. range is practically eliminated by a form of the improved circuit.

The compensating rectifier is connected in an impedance network in such manner that at full scale reading only a small fraction of the input alternating-current voltage is applied to it. It is thus operated at the low end of its characteristic where the curvature is most prominent. The output characteristic of the compensating rectifier is the combined result of this curvature and of the limited voltage applied. This output voltage is subtracted from that of the primary rectifier to which the much larger full-scale voltage is applied. While the curvature of the primary rectifier's characteristic is considerably less than that of the compensating rectifier, its output is considerably greater. The output of both rectifiers in combination is practically linear, when properly related portions of their characteristics are used, and this is true for the 60-cycle power frequency as at higher audio frequencies.

The improved linearity of this rectifier circuit will be found useful in other applications than that for which it was especially developed, and while it is particularly effective with thermionic diodes, other rectifiers (such as detector triodes and crystals) having similarly curved rectification characteristics may also be used in achieving the broader purposes of the present invention.

The invention will be better understood from the following detailed description of a preferred embodiment thereof and the specific discussion of underlying theory. In the drawings:

Figure 1 is the wiring diagram of a multiple-range instrument designed for A.-C. and D.-C. use.

Figure 2 is a graphical representation of various rectifier characteristics singly and combined, and of a schematic wiring diagram that is considered similar in principle to the preferred form shown in Figure 1.

Referring now to Figure 1 there is shown a D.-C. milliammeter 10 alternatively shunted by adjustable resistors 12 and 14, the choice of the appropriate resistor being effected by selector switch 16. Milliammeter 10 is energized from linear D.-C. amplifier 18, which is preferably of balanced design having an input channel bucking a generally symmetrical but stabilized channel. Thus, more specifically, a voltage is applied to milliammeter 10 from cathodes 20 and 22 in two bucking channels and it is the difference in the D.-C. volt-drop across cathode resistor 24 (connected between cathode 20 and B minus which is grounded) and cathode resistor 26 (connected between cathode 22 and ground). The input to amplifier 18 is alternatively connected by selector switch 34 to terminal 28 and grounded terminal 30, or to a rectifier circuit having input terminals 32, 30, for D.-C. and A.-C. voltages respectively. The A.-C. input voltage (after rectification) or the D.-C. input voltage is either directly or fractionally applied to the input of amplifier 18 by virtue of tapped voltage divider 36. The inclusion of amplifier 18 is a refinement intended to isolate the milliammeter from the input circuit, in such a way that the milliammeter with its adjustable shunting resistors does not load and reflect variations into the circuit under test. This amplifier does not necessarily provide a voltage gain. The meter current is technically obtained from the direct-current supply of the output stage of amplifier 18, controlled in amount by the input to the amplifier; but this is broadly equivalent to the direct application of the input voltage to an appropriate direct-current meter itself. The amplifier plus the meter constitutes a vacuum-tube voltmeter or, more broadly, a voltage-responsive utilization device.

In instruments designed for alternating-current and direct-current measurements a diode and condenser are commonly used to provide a D.-C. voltage which will be a measure of the A.-C. input voltage, enabling a single instrument to be used for both A. C. and D. C. ranges. In the present instance, condenser 40 and primary diode 42 operate to develop a D.-C. potential across voltage divider 36, making the upper end variously negative with respect to ground in dependence on the A.-C. voltage applied to terminals 30, 32. Between condenser 40 and the upper end of voltage divider 36 are series resistors 44 and 46 which, with condenser 48, constitute a filter for limiting the ripple voltage in the output. This ripple is composed of the true A.-C. component due to the resistive voltage drop across the diode during conductive half-cycles, and the pulses developed across the diode during non-conductive half-cycles. The deflection of milliammeter 10 when caused by an A.-C. voltage applied to the network described above is shown in Figure 2 at a and b, for different sensitivities of the milliammeter as determined by the setting of shunt 12.

Both curves a and b have appreciable curvature, a factor that would necessitate a special scale for the A.-C. range shown in order that the readings may be accurate within a narrow tolerance at all parts of the scale. It is to correct for this curvature that the following additional circuit has been included.

A second diode section 50 has its cathode grounded and its anode connected to the end of voltage divider 51 remote from the ground. An alternating current voltage is applied to this diode through condenser 52 from a portion of the A.-C. input circuit where only a small fraction of the input (though distorted in wave-form) is available. Assuming that the presence of condenser 48 across voltage divider 36 is effective to reduce the ripple voltage to zero, condenser 52 is connected to such point in this R.-C. filter as to apply the small remaining A.-C. voltage to diode 50. The rectified output of diode 50 is then applied to voltage divider 51. It is apparent that the A.-C. voltage available to diode 50 is some portion of the resistive drop across diode 42 during conductive half cycles, plus the pulsating D.-C. voltage developed during those half-cycles when diode 42 is not conductive. Curve c represents an exaggeration of the negative of the meter deflection that should be expected were the connection between resistor 46 and voltage divider 36 broken. The curvature is far greater (for the fractional voltage applied to diode 50) than that of curves a and b representing the output of diode 42. When curve c is subtracted from curve a a characteristic d is had which is much closer to perfect linearity than should be expected from a single diode alone.

To the right in Figure 2, diode 50' and condenser 52' are schematically shown as deriving a fraction of the A.-C. voltage applied to terminals 32' and 30', as determined by the tap in voltage divider D across those terminals. This fractional voltage, when rectified (curve c), is subtracted from the full A.-C. voltage when rectified (curve a) to yield the desired linear output as represented by straight-line characteristic d. Voltage dividers 36 and 51 are ganged, and thus supply amplifier 18 with corresponding fractions of the D.-C. output from diodes 42 and 50, when switched to various taps in those voltage dividers.

The fractional part of the input A.-C. voltage is derived in Figure 1 from the A.-C. drop across diode 42 and the D.-C. pulsation. Because of the fact that the resistive drop is non-linear, a variable fraction of the input voltage is applied to diode 50. This is represented in Figure 2 by making the lower part C of voltage divider D adjustable.

In an illustrative embodiment of the invention constructed according to Figure 1 condensers 40, 48 and 52 are .03, .01 and .01 microfarads, resistors 44, 46 and 36 are approximately 6.6, 3.3 and 16 megohms respectively, and diodes 42 and 50 are the two sections of a single type 7A6 thermionic rectifier. This network is used for enabling utilization of a 10-volt linearly divided scale on milliammeter 10 for both 10-volt D. C. and 10-volt A. C. ranges. In switching from A. C. to D. C., selector switch 16 and 34 are simultaneously shifted, and in addition selector switch 54 is shifted to break the connection between diode 50 and the grid-end of tapped divider 51.

It will be self-evident that this arrangement is useful for other ranges than 10-volt A. C. range as described. The same scale, with a suitably tapped pair of dividers 36 and 51 can be used with excellent precision for 30, 100 and 300 volt ranges of A. C. and D. C., although the compensation effect diminishes above the 10-volt range with the components specified. In the higer ranges the linearity of diode 42 is ordinarily satisfactory. The rectifier-filter network shown is thus effective to extend the linearity of a rectifier characteristic to a lower-than-usual range. While this feature makes it admirably suited to a measuring instrument having multiple A. C. and D. C. ranges it is evidently useful in a multi-range instrument having a rectifier and a direct-current meter-movement intended solely for A.-C. measurements, and in circuits where some other linearly responsive utilization device is used in substitution for milliammeter 10.

What is claimed is:

1. An alternating-current measuring instrument comprising a direct-current voltmeter having a linear scale and a diode for adapting said voltmeter to measurement of alternating current input, in combination with a second diode, and a passive alternating current voltage dropping circuit supplying a predetermined fraction of the alternating-current input to said second diode, the output of said diodes being connected in mutually opposing relation and providing substantially linear direct-current output for said voltmeter in relation to the alternating-current input to be measured.

2. In combination, a direct-current voltmeter having a linear scale and a thermionic rectifier for adapting said voltmeter to measurement of alternating current input, a second thermionic rectifier, and a passive alternating-current voltage divider having a tap supplying a predetermined fraction of the alternating current input to said second rectifier, the output of said rectifiers being connected in mutually opposing relation so as to apply the difference in rectified voltages to said voltmeter.

3. A voltmeter for alternating-current and direct-current readings having a single linear scale for both types of readings including in combination a direct-current meter, a pair of direct-current input terminals and a pair of alternating-current input terminals, a direct-current coupling between said direct-current input terminals and said meter, and a rectifier circuit between said alternating current input terminals and said meter, said rectifier circuit including a diode and a condenser in series across said terminals, a resistor-condenser filter across said diode, and a second diode and condenser connected in series to a fractional voltage point of said resistor-condenser filter, the output of said diodes being connected in opposition and coupled to said meter, and a switch for selectively completing the coupling between said meter and said direct-current terminals or said rectifier circuit.

4. An alternating-current voltage measuring instrument including in combination, a vacuum-tube voltmeter comprising a pair of opposed channels of balanced design connected to a neutral line and a direct current meter at the output of said channels to indicate the amount of any unbalanced output thereof, a pair of input terminals one of which is connected to said neutral line, and a rectifier circuit between said input terminals and said vacuum-tube voltmeter comprising a condenser and diode connected in series across said input terminals and having their connection coupled to the input end of one of said channels, a passive alternating-current voltage reducing circuit, and a compensating diode and condenser connected in series to said reducing circuit, the input end of the other of said channels being connected between said second condenser and said compensating diode.

5. An alternating-current voltage measuring instrument as in claim 4, wherein each of said diodes has a cathode and an anode, and said cathodes are joined together and to said neutral line, whereby the output applied by said rectifier circuit to said vacuum-tube voltmeter will be increasingly negative as higher alternating-current voltages are applied to said input terminals.

6. In a circuit for converting alternating-current voltage to direct-current voltage and having input and output connections, a first condenser and a first diode connected in series across said input connections, a low-pass filter connected to the connection of said diode to said condenser, said filter having a fractional voltage tap, a second diode connected in series with a second condenser between one of said input connections and the fractional voltage tap in said filter, and a utilization device connected between said filter and the connection of said second diode to said second condenser.

7. A linear-output rectifier circuit comprising a first rectifier having a relatively seriously curved characteristic for low applied voltage, and only slight curvature for higher applied voltages, a second rectifier having a similar characteristic, an input circuit to said rectifiers in which the alternating-current voltage applied to said first rectifier is reduced and applied as a fractional portion thereof to said second rectifier, and an output circuit for said rectifiers in which the separate outputs of the respective rectifiers are derived in mutual opposition.

8. A rectifier circuit comprising a first rectifier having a moderately curved characteristic for the lower portions of its range and a slightly curved characteristic for higher portions of its range, alternating-current input connections to said rectifier and a direct-current output circuit for said rectifier including a tapped filter, and a second rectifier having a similar characteristic coupled to the tap in said filter, and a direct-current output circuit including the direct-current output from said filter and from said second rectifier, said outputs being connected in opposition.

9. An alternating current rectifying circuit comprising a rectifier positive and negative terminals and having an output characteristic more sharply curved at low input voltages than at high input voltages combined with a condenser having one terminal joined to one terminal of said rectifier, the opposite terminals of said condenser and said rectifier constituting alternating-current input terminals, a second like rectifier combined with a second condenser, passive circuit connections between said rectifier-condenser combinations applying to the second rectifier only a predetermined fraction of the alternating voltage that is applied to the first rectifier, and further connections between said rectifier-condenser combinations combining the rectified voltages in mutual opposition, thereby to yield a more linear rectified output characteristic for the circuit than that of the single rectifier.

10. An alternating-current rectifying circuit comprising a first rectifying subcircuit including a rectifier having an output characteristic more sharply curved at low input voltages than at high input voltages, a second rectifying circuit having a like rectifier, passive circuit connections for applying to said second rectifier a predetermined fraction only of the alternating-current voltage that is applied to the first rectifier, and further connections combining said rectifying subcircuits with the output polarity of one opposing that of the other, thereby to yield a more linear rectifier characteristic than that of a single rectifier.

11. A rectifier network including a pair of diodes, passive circuit means applying a given alternating-current voltage to one of said diodes and a predetermined fraction only of the given voltage to the other of said diodes, and an output circuit combining the rectified output of said diodes in mutual opposition.

WILLIAM H. BRESEE.

REFERENCES CITED

The following references are of record in the file of this patent:

UNITED STATES PATENTS

| Number | Name | Date |
|---|---|---|
| 2,198,226 | Peterson | Apr. 23, 1940 |
| 2,270,697 | Clark | Jan. 20, 1942 |
| 2,316,044 | Blair | Apr. 6, 1943 |
| 2,324,215 | Kinsburg | July 13, 1943 |

FOREIGN PATENTS

| Number | Country | Date |
|---|---|---|
| 459,563 | Great Britain | Jan. 11, 1937 |
| 525,690 | Great Britain | Sept. 3, 1940 |
| 522,276 | Great Britain | June 13, 1940 |